US010209475B2

(12) United States Patent
Wang

(10) Patent No.: US 10,209,475 B2
(45) Date of Patent: Feb. 19, 2019

(54) MODULAR BREAKOUT ENCLOSURE FOR TRANSITIONING FROM TRUNK CABLE TO JUMPER CABLE

(71) Applicant: CommScope Technologies LLC, Hickory, NC (US)

(72) Inventor: Chi-Ming Wang, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/926,250

(22) Filed: Mar. 20, 2018

(65) Prior Publication Data

US 2018/0275363 A1   Sep. 27, 2018

Related U.S. Application Data

(60) Provisional application No. 62/474,252, filed on Mar. 21, 2017.

(51) Int. Cl.
| | |
|---|---|
| *G02B 6/44* | (2006.01) |
| *G02B 6/38* | (2006.01) |
| *H02G 3/04* | (2006.01) |
| *H02G 3/18* | (2006.01) |
| *H01R 31/02* | (2006.01) |
| *H02G 3/08* | (2006.01) |

(52) U.S. Cl.
CPC ......... *G02B 6/4471* (2013.01); *G02B 6/3817* (2013.01); *G02B 6/3871* (2013.01); *G02B 6/4472* (2013.01); *H01R 31/02* (2013.01); *H02G 3/0493* (2013.01); *H02G 3/083* (2013.01); *H02G 3/18* (2013.01); *G02B 6/3825* (2013.01); *G02B 6/3897* (2013.01); *G02B 6/4416* (2013.01)

(58) Field of Classification Search
None
See application file for complete search history.

(56) References Cited

U.S. PATENT DOCUMENTS

| | | | |
|---|---|---|---|
| 5,202,538 | A | 4/1993 | Skirpan |
| 5,938,462 | A | 8/1999 | Wilson et al. |
| 6,045,399 | A | 4/2000 | Yu |
| 6,340,250 | B1 | 1/2002 | Auclair |

(Continued)

FOREIGN PATENT DOCUMENTS

| | | |
|---|---|---|
| KR | 2015-0006712 | 1/2015 |
| WO | 2013/063045 | 5/2013 |

(Continued)

OTHER PUBLICATIONS

International Search Report and Written Opinion for corresponding PCT Application No. PCT/US2015/014347, dated May 15, 2015.

(Continued)

*Primary Examiner* — Jerry Rahll
(74) *Attorney, Agent, or Firm* — Myers Bigel, P.A.

(57) ABSTRACT

A module for distributing optical fibers from a trunk cable includes: an enclosure having bottom, top and side walls; a first fiber optic connector mounted on the bottom wall; a second fiber optic connector mounted on the top wall; a plurality of third connectors mounted to the side wall; a first set of optical fibers routed between the first and second optical connectors; and a second set of optical fibers routed between the first optical connector and the plurality of third connectors.

20 Claims, 3 Drawing Sheets

(56) References Cited

U.S. PATENT DOCUMENTS

| | | |
|---|---|---|
| 6,711,337 B2 | 3/2004 | Hodge et al. |
| 6,993,237 B2 | 1/2006 | Cooke et al. |
| 7,136,555 B2 | 11/2006 | Theuerkorn et al. |
| 7,292,763 B2 | 11/2007 | Smith et al. |
| RE40,358 E | 6/2008 | Thompson et al. |
| 7,477,824 B2 | 1/2009 | Reagan et al. |
| 7,489,849 B2 | 2/2009 | Reagan et al. |
| 7,791,864 B2 | 9/2010 | Matyas et al. |
| 7,805,044 B2 | 9/2010 | Reagan et al. |
| 7,837,397 B2 | 11/2010 | Fingler et al. |
| 7,844,158 B2 | 11/2010 | Gronvall et al. |
| 7,893,567 B1 | 2/2011 | Deros et al. |
| 8,275,228 B2 | 9/2012 | Livingston et al. |
| 8,401,387 B2 | 3/2013 | Biegert et al. |
| 8,532,490 B2 | 9/2013 | Smith et al. |
| 8,565,571 B2 | 10/2013 | Kimbrell et al. |
| 8,792,767 B2 | 7/2014 | Fabrykowski et al. |
| 8,929,740 B2 | 1/2015 | Smith et al. |
| 9,069,151 B2 | 6/2015 | Conner |
| 9,078,287 B2 | 7/2015 | Khemakhem et al. |
| 9,606,320 B2 | 3/2017 | Wang |
| 9,742,176 B2 | 8/2017 | Wang |
| 2005/0163448 A1 | 7/2005 | Blackwell, Jr. et al. |
| 2005/0175307 A1 | 8/2005 | Battey et al. |
| 2005/0213921 A1 | 9/2005 | Smith et al. |
| 2006/0056782 A1 | 3/2006 | Elkins, II et al. |
| 2006/0093303 A1 | 5/2006 | Reagan et al. |
| 2009/0226181 A1 | 9/2009 | Fingler et al. |
| 2011/0097052 A1 | 4/2011 | Solheid et al. |
| 2012/0008257 A1 | 1/2012 | Rebers et al. |
| 2012/0295486 A1 | 11/2012 | Petersen et al. |
| 2013/0084050 A1 | 4/2013 | Vastmans et al. |
| 2013/0088407 A1 | 4/2013 | King et al. |
| 2013/0108227 A1 | 5/2013 | Conner |
| 2013/0146355 A1 | 6/2013 | Strasser et al. |
| 2014/0140671 A1 | 5/2014 | Islam |
| 2014/0199079 A1 | 7/2014 | Smith et al. |
| 2015/0219856 A1 | 8/2015 | Wang |
| 2015/0270637 A1 | 9/2015 | Islam et al. |
| 2015/0270654 A1 | 9/2015 | Islam et al. |
| 2016/0266326 A1 | 9/2016 | Gniadek |
| 2016/0276817 A1 | 9/2016 | Wang |

FOREIGN PATENT DOCUMENTS

| | | |
|---|---|---|
| WO | 2013/165831 | 11/2013 |
| WO | 2015/186067 | 12/2015 |

OTHER PUBLICATIONS

International Search Report and Written Opinion for corresponding PCT Application No. PCT/US2016/022600, dated Jun. 27, 2016.

Notification Concerning Transmittal of International Preliminary Report on Patentability for corresponding PCT Application No. PCT/US2016/022800 dated Sep. 28, 2017.

Notification of Transmittal of the International Search Report and the Written Opinion of the International Searching Authority, or the Declaration for corresponding PCT Application No. PCT/US2017/052133, dated Jan. 11, 2018.

Supplemental European Search Report corresponding to European Application No. 15746888:9, dated Aug. 22, 2017.

International Search Report and Written Opinion Corresponding to International Application No. PCT/US2016/068273; dated Feb. 21, 2017; 12 Pages.

International Preliminary Report on Patentability, PCT International Application No. PCT/US2016/068273, dated Jul. 19, 2018, 8 pp.

Notification of Transmittal of the International Search Report and the Written Opinion of the International Searching Authority, or the Declaration corresponding to International Application No. PCT/US2018/023244 dated Jun. 22, 2018.

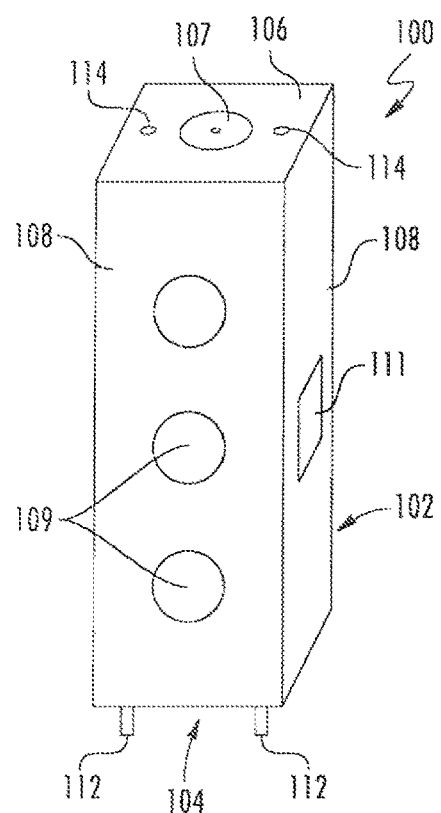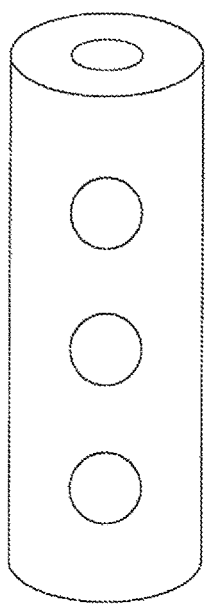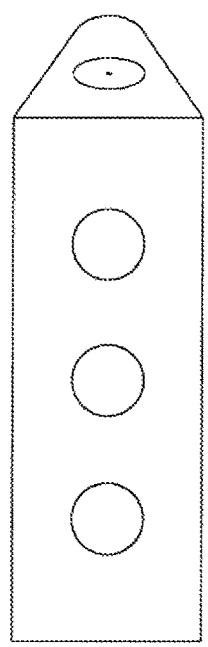
FIG. 1A  FIG. 1B  FIG. 1C
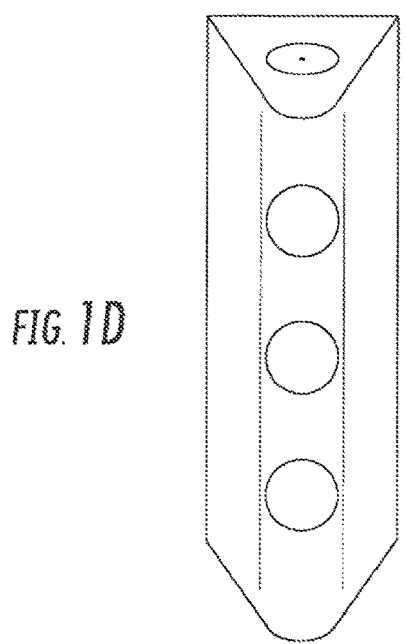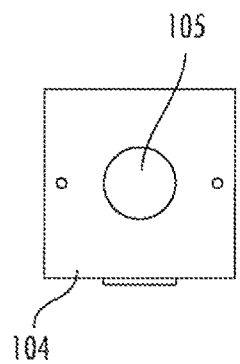
FIG. 1D  FIG. 1E

MODULAR BREAKOUT ENCLOSURE FOR TRANSITIONING FROM TRUNK CABLE TO JUMPER CABLE

RELATED APPLICATION

The present application claims priority from and the benefit of U.S. Provisional Patent Application No. 62/474,252, filed Mar. 21, 2017, the disclosure of which is hereby incorporated herein in its entirety.

FIELD OF THE INVENTION

The present invention relates generally to power and signal distribution, and more particularly to distribution from hybrid cables.

BACKGROUND

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based system, a single hybrid trunk cable can be used to power multiple sectors, thereby eliminating multiple runs of RF cable. However, in order to use a single hybrid trunk cable, at some point the trunk cable must transition to jumper cables. Typically, these are distributed inside an enclosure that transitions the trunk conductor gauge to the jumper conductor gauge and connects the optical fibers in the trunk to the optical fibers in the jumper cables. Currently, transitions are achieved by making connections inside the enclosure, requiring it to be opened, cables to be fed/mated to the enclosure, and power and fiber connections to be made, all in the field (e.g., on the top of cell sites near a remote radio unit (RRU)). This practice can create many issues for installers, including time, safety, connection errors (such as loose power connections and/or poor fiber cleaning), and more opportunity for connector damage.

In co-assigned and co-pending U.S. patent application Ser. No. 14/448,269, filed Jul. 31, 2014, the disclosure of which is hereby incorporated herein in its entirety, devices are described that provide a solution to some of the issues described above. The devices discussed therein comprise an enclosure having mixed media connectors in one or two walls to receive jumper cables. A hybrid fiber-power trunk cable is routed to the bottom wall of the enclosure, then is routed within the enclosure to the mixed media connectors. The trunk cable is either attached to the enclosure via a trunk cable connector, which is then connected with the mixed media connectors, or is routed through a cable gland in the bottom wall of the enclosure and connected with the mixed media connectors. Co-assigned and co-pending U.S. patent application Ser. No. 15/071,620, filed Mar. 16, 2016 (also incorporated herein by reference in its entirety), discusses a number of embodiments of enclosures, some of which have side walls for mounting mixed media connectors that form a triangular or trapezoidal cross-section.

SUMMARY

As a first aspect, embodiments of the invention are directed to a module for distributing optical fibers from a trunk cable. The module comprises: an enclosure having bottom, top and side walls; a first fiber optic connector mounted on the bottom wall; a second fiber optic connector mounted on the top wall; a plurality of third connectors mounted to the side wall; a first set of optical fibers routed between the first and second optical connectors; and a second set of optical fibers routed between the first optical connector and the plurality of third, connectors.

As a second aspect, embodiments of the invention are directed to a combination of the module described above and a base module, the base module comprising: a trunk cable having a plurality of optical fibers; an enclosure having bottom, top and side walls; a fourth fiber optic connector mounted on the top wall; a plurality of fifth connectors mounted to the side wall; a third set of optical fibers routed between the trunk cable and the fourth optical connector; and a fourth set of optical fibers routed between the trunk cable and the plurality of fifth connectors. The fourth fiber optic connector of the base module is mated with the first fiber optic connector of the module.

As a third aspect, embodiments of the invention are directed to a modular assembly for distributing optical fibers from a trunk cable comprising (a) a module and (b) a base module. The module comprises: an enclosure having bottom, top and side walls; a first fiber optic connector mounted on the bottom wall; a second fiber optic connector mounted on the top wall; a plurality of third hybrid connectors, mounted to a first one of the side walls; a power connector mounted to a second one of the side walls; a first set, of optical fibers routed between the first and second optical connectors; a second set of optical fibers routed between the first optical connector and the plurality of third connectors; and a first set of power conductors routed between the power connector and the third hybrid connectors. The base module comprises: a hybrid trunk cable having a plurality of optical fibers and a plurality of power conductors; an enclosure having bottom, top and side walls; a third fiber optic connector mounted on the top wall; a plurality of fifth hybrid connectors mounted to one of the side walls; a third set of optical fibers routed between the hybrid trunk cable and the third fiber optic connector; a fourth set of optical fibers routed between the trunk cable and the plurality of fifth connectors; and a second set of power conductors routed between the hybrid trunk cable and the plurality of fifth hybrid connectors. The third fiber optic connector of the base module is mated with the second fiber optic connector of the module.

BRIEF DESCRIPTION OF THE FIGURES

FIG. 1A is a top perspective view of a hybrid cable breakout module according to embodiments of the invention.

FIG. 1B is a top perspective view of a hybrid cable breakout module according to alternative embodiments of the invention.

FIG. 1C is a top perspective view of a hybrid cable breakout module according to further embodiments of the invention.

FIG. 1D is a top perspective view of a hybrid cable breakout module according to still further embodiments of the invention.

FIG. 1E is a bottom view of the module of FIG. 1A.

DETAILED DESCRIPTION

Figure 2A:
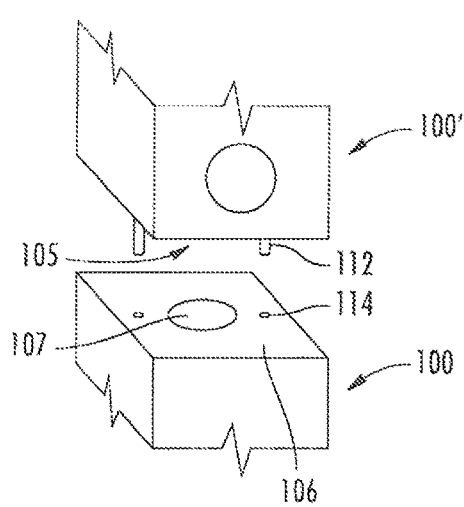
FIG. 2A is a partial perspective view of two modules of FIG. 1A aligned for mating.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when element (e.g., an assembly, a housing, a cable, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to the figures, a breakout enclosure module for distributing power and fiber from a hybrid trunk cable is shown in FIG. 1A and designated broadly at 100. The module 100 represents a building block that can be used to create a larger distribution assembly for cellular tower power and fiber distribution. Use of a modular concept as described below can "leverage" the relatively low cost of optical fiber and, the high capacity of MPO connectors or other fiber optic connectors to pre install extra optical fibers in each module. Further power conductors may then be attached to the module at a later time. As a result, a 3 or 6 RRU system (or some other common configuration) could be mounted on an antenna tower, monopole, or the like, then could be expanded as needed by running a separate power feed to power additional modules as they are mated.

The module 100 includes an enclosure 102 with a bottom wall 104, a top wall 106, and one or more side walls 108. As can be seen in FIGS. 1A-1D, the side walls 108 may vary in number and shape to define different cross-sections (e.g., square, as in FIG. 1A, circular, as in FIG. 1B, triangular, as in FIG. 1C, semi-elliptical, as in FIG. 1D, or other variations such as rectangular, trapezoidal, ovoid and the like). The enclosure 102 may be formed of any number and type of materials, including metallic and polymeric materials.

The side walls 108 include three hybrid connectors 109 (also called "multi-media" connectors) that can receive hybrid jumper cables (other numbers of hybrid connectors 109 may also be employed). The hybrid jumper cables attached to the hybrid connectors 109 can then be connected to RRUs, antennas and other electronic equipment at the top of an antenna tower. Discussion of exemplary hybrid connectors is set forth in the aforementioned U.S. patent application Ser. Nos. 14/448,269 and 15/071,620 and need not be discussed, in detail herein. In some embodiments, the hybrid connectors 109 may be replaced with separate fiber and power connectors.

The top wall 106 of the module 100 includes an MPO connector 107. Similarly, the bottom wall 104 of the module 100 includes a mating MPO connector 105 (see FIG. 1E). One of the side walls 108 also includes a power connector 111 (see FIG. 1A). The power connector 111 is configured to receive a connector from a trunk power cable.

As would be expected, a first set of optical fibers is connected between the MPO connector 105 and the MPO connector 107. A second set of optical fibers is connected between the MPO connector 105 and the hybrid connectors 109. Also, power conductors are connected between the power connector 111 and the hybrid connectors 109.

As shown in FIG. 2A, a first module 100 can mate with a second module 100' to form a two-module assembly in which the MPO connector 107 of the first module 100 optically connects with the MPO connector 105 of the second module 100'. To facilitate alignment and secure interconnection of the modules 100, 100', each module 100, 100' includes a pair of pins 112 that extend downwardly from the bottom wall 104. Each module 100, 100' also includes, a pair of holes 114 on the top wall 106. As can be seen in FIG. 2A, the pins 112 on the module 100' can be received in the holes 114 of the module 100 to assist with maintaining the interconnection between the modules 100, 100' once the MPO connector 107 of the module 100 is mated with the MPO connector 105 of the module 100'. Also, in some embodiments a sealing feature or component, such as a gasket or O-ring, may be included on the MPO connectors 105, 107, on the top and/or bottom walls 106, 104, and/or at the edges of the side walls 108 to protect the mated interconnection from the environment.

Figure 2B:
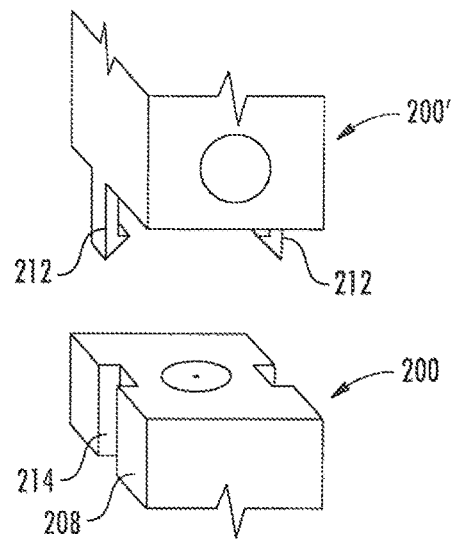
FIG. 2B is a partial perspective view of two modules according to alternative embodiments of the invention aligned for mating.
Figure 2C:
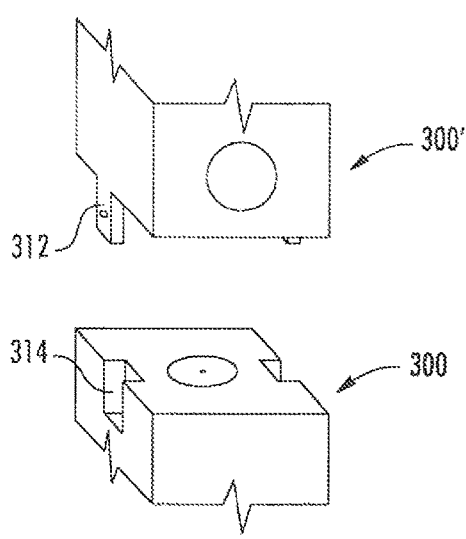
FIG. 2C is a partial perspective view of two modules according to further embodiments of the invention aligned for mating.

FIGS. 2B and 2C illustrate other exemplary configurations for maintaining modules in a mated condition. FIG. 2B shows a module 200' that includes two latches 212 that are received in recesses 214 in the side walls 208 of the module 200. FIG. 2C shows a module 300' that includes two tabs 312 that are received in recesses 314 in a module 300 and secured in place with screws or other fasteners. These techniques also register the mating modules in proper alignment. Other joining techniques may also be employed, such as a "bayonet" and "track" system, a threaded system, a "keyed" system", and the like, including combinations of these (for example, a keyed system may be combined with a threaded coupling nut). Also, any of the illustrated techniques may be reversed (e.g., the pins may be on the top wall 106 of a module 100 and the holes in the bottom 104).

Figure 3A:
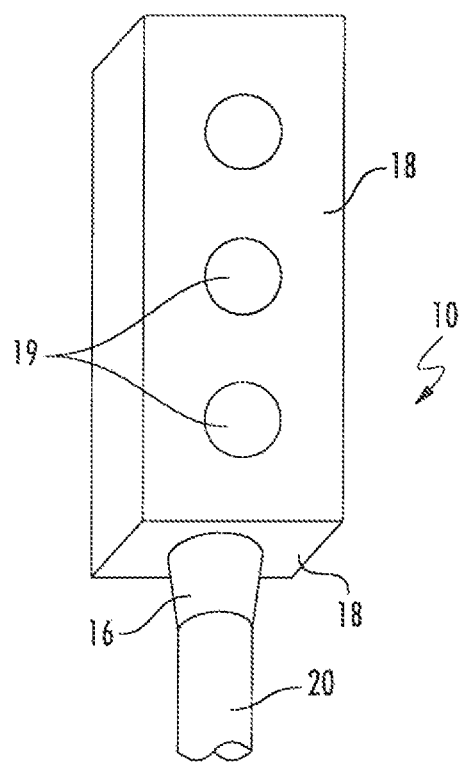
FIG. 3A is a bottom perspective view of a base module according to embodiments of the invention.
Figure 3B:
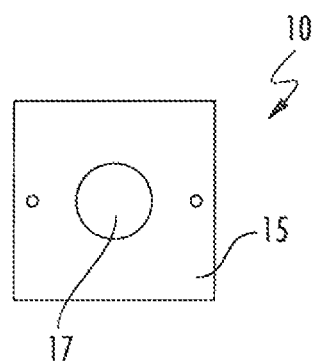
FIG. 3B is a top view of the base module of FIG. 3A.

As shown in FIGS. 3A and 3B, a base module 10 is employed to serve as the transition between a hybrid trunk cable and any modules 100 stacked above the base module 10. Externally, the base module 10 can have the same configuration as the module 100 discussed above with the exceptions that, (a) the base module 10 lacks a power connector 111, and (b) instead of having an MPO connector 105 in the bottom wall 104, the base module 10 has a nozzle 16 attached to the bottom wall 14 through which the hybrid trunk cable 20 is routed. The nozzle 16 serves to attach and seal the hybrid trunk cable 20 and the base module 10. Those skilled in this art will appreciate that other configurations for attaching a sealing a hybrid trunk cable 30 to an enclosure (e.g., a cable gland, a grommet, and the like) may also be employed.

The base module 10 is configured such that a third set of optical fibers of the hybrid trunk cable 20 that is routed to the MPO connector 17 on the top wall 15, and a fourth set of the optical fibers of the hybrid trunk cable 20 that is routed to the hybrid connectors 19. The power conductors of the hybrid trunk cable 20 are routed to the hybrid connectors 19.

The MPO connector 17 on the top wall 15 can mate with the MPO connector 105 of a module 100 to form a two-module assembly. Power is supplied to the power conductors of the module 100 via a trunk power cable connected to the power connector 111. The module 100 can then be mated with a second module 100' (as shown in FIG. 2A) to continue to build a modular assembly.

Typically, the modules 100 have a cross-sectional profile of between about 2"×2" to 3"×3". Modules of this size may be hoisted within a typical monopole. In some embodiments, a pulling feature (such as a hook or eyelet) may be included to facilitate pulling up the modules 100 inside a crowded monopole. The modules may also have a covering, a canopy/bumper guard, or rounded edges to prevent snagging. Some of these features are discussed in U.S. patent application Ser. Nos. 14/448,269 and 15/071,620, supra.

In additional embodiments, installation features, such as brass inserts, may be included on one of the side walls 108 that lack connectors (for example, the side wall 108 opposite the connectors), or be included on multiple side walls 108 to allow installers greater freedom of installation. Alternatively, the modules 100 may be mounted with straps, wherein the modules 100 may have tracks, grooves, or other features that facilitate the use of straps.

Also, by allowing limited rotation of the MPO connectors 105, 107, multiple modules 100 may be arranged with one set of connectors facing forward, one facing left, and one facing right if RRUs are located in different directions from the module 100.

In some embodiments, the power connector 111 may be a conductive terminal (likely covered) that can connect to a power cable. The terminal and cable may include means for sealing the interface (e.g., the cable may slide into place to contact the terminal, thereby creating a seal between the cable and the module 100). The power connector 111 may also be located on the bottom will 104 of the enclosure 102, on a flange that projects from the bottom wall 104 or side wall 108, or on the rear side of the side walls 108 to hide it from view.

Those skilled in this art will appreciate that the base module 10 and module 100 may be used with fiber optical cables only (rather than hybrid cables), in which case the module 100 would lack the power connector 111, and the connectors 109 would be fiber optic connectors. Also, in other embodiments the module 100 may include additional fibers for flexibility.

As another alternative conductors may be included within the module 100. This would avoid the need for the power connector 111, and would require the inclusion of power connectors on the top and bottom walls for interconnection of power between modules.

It may also be advantageous to include a removable protective cap that fits over the MPO connectors of the modules to protect these connectors from the environment prior to their interconnection with another MPO connector or a different module. Finally, more than one MPO connector may be located on the top and bottom walls to increase the number of fibers available.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

That which is claimed is:

1. A module for distributing optical fibers from a trunk cable, comprising:
   an enclosure having bottom, top and side walls;
   a first fiber optic connector mounted on the bottom wall;
   a second fiber optic connector mounted on the top wall;
   a plurality of third connectors mounted to the side wall;
   a first set of optical fibers routed between the first and second optical connectors; and
   a second set of optical fibers routed between the first optical connector and the plurality of third connectors,
   wherein the plurality of third connectors comprises hybrid connectors.

2. The module defined in claim 1, further comprising a power connector mounted to a second side wall and a plurality of power conductors routed between the power connector and the plurality of third connectors.

3. The module defined in claim 1, wherein the first fiber optic connector is configured to mate with a connector like the second fiber optic connector.

4. The module defined in claim 3, wherein the first and second fiber optic connectors are MPO connectors.

5. The module defined in claim 3, further comprising securing features to maintain mating of the module with a second module.

6. The module defined in claim 1, wherein the module is a first module, and further comprising a second module of claim 1 mated to the first module, with the first connector of the first module mating with the second connector of the second module.

7. The module defined in claim 1, further comprising a sealing feature associated with the first and/or second fiber optic connectors.

8. The module defined in claim 1, in combination with a base module, the base module comprising:
   a trunk cable having a plurality of optical fibers;
   an enclosure having bottom, top and side walls;
   a fourth fiber optic connector mounted on the top wall;
   a plurality of fifth connectors mounted to the side wall;
   a third set of optical fibers routed between the trunk cable and the fourth optical connector; and
   a fourth set of optical fibers routed between the trunk cable and the plurality of fifth connectors;
   wherein the fourth fiber optic connector of the base module is mated with the first fiber optic connector of the module.

9. The combination defined in claim 8, wherein the plurality of fifth connectors comprises hybrid connectors.

10. The combination defined in claim 8, wherein the trunk cable is a hybrid trunk cable having a plurality of power conductors.

11. The combination defined in claim 10, wherein the power conductors of the hybrid trunk cable are routed to the fifth connectors.

12. A modular assembly for distributing optical fibers from a trunk cable, comprising:
   (a) a module comprising:
      an enclosure having bottom, top and side walls;
      a first fiber optic connector mounted on the bottom wall;
      a second fiber optic connector mounted on the top wall;
      a plurality of third hybrid connectors mounted to a first one of the side walls;

a power connector mounted to a second one of the side walls;
a first set of optical fibers routed between the first and second optical connectors;
a second set of optical fibers routed between the first optical connector and the plurality of third connectors; and
a first set of power conductors routed between the power connector and the third hybrid connectors; and (b) a base module comprising:
a hybrid trunk cable having a plurality of optical fibers and a plurality of power conductors;
an enclosure having bottom, top and side walls;
a third fiber optic connector mounted on the top wall;
a plurality of fifth hybrid connectors mounted to one of the side walls;
a third set of optical fibers routed between the hybrid trunk cable and the third fiber optic connector;
a fourth set of optical fibers routed between the trunk cable and the plurality of fifth connectors; and
a second set of power conductors routed between the hybrid trunk cable and the plurality of fifth hybrid connectors;
wherein the third fiber optic connector of the base module is mated with the second fiber optic connector of the module.

13. The modular assembly defined in claim 12, wherein the first, second and third fiber optic connectors are MPO connectors.

14. The modular assembly defined in claim 12, wherein the module further comprises securing features to maintain mating of the module with a second identical module.

15. A module for distributing optical fibers from a trunk cable, comprising:
an enclosure having bottom, top and side walls;
a first fiber optic connector mounted on the bottom wall;
a second fiber optic connector mounted on the top wall;
a plurality of third connectors mounted to the side wall;
a first set of optical fibers routed between the first and second optical connectors; and
a second set of optical fibers routed between the first optical connector and the plurality of third connectors,
wherein the module is a first module, and further comprising a second module mated to the first module, with the first connector of the first module mating with the second connector of the second module.

16. The module defined in claim 15, wherein the plurality of third connectors comprises hybrid connectors.

17. The module defined in claim 15, further comprising a power connector mounted to a second side wall and a plurality of power conductors routed between the power connector and the plurality of third connectors.

18. A module for distributing optical fibers from a trunk cable, in combination with a base module, the module comprising:
an enclosure having bottom, top and side walls;
a first fiber optic connector mounted on the bottom wall;
a second fiber optic connector mounted on the top wall;
a plurality of third connectors mounted to the side wall;
a first set of optical fibers routed between the first and second optical connectors; and
a second set of optical fibers routed between the first optical connector and the plurality of third connectors, and
the base module comprises:
a trunk cable having a plurality of optical fibers;
an enclosure having bottom, top and side walls;
a fourth fiber optic connector mounted on the top wall;
a plurality of fifth connectors mounted to the side wall;
a third set of optical fibers routed between the trunk cable and the fourth optical connector; and
a fourth set of optical fibers routed between the trunk cable and the plurality of fifth connectors;
wherein the fourth fiber optic connector of the base module is mated with the first fiber optic connector of the module.

19. The module defined in claim 17, wherein the plurality of third connectors comprises hybrid connectors.

20. The module defined in claim 17, wherein the first, second and third fiber optic connectors are MPO connectors.

* * * * *

UNITED STATES PATENT AND TRADEMARK OFFICE
CERTIFICATE OF CORRECTION

PATENT NO. : 10,209,475 B2  
APPLICATION NO. : 15/926250  
DATED : February 19, 2019  
INVENTOR(S) : Chi-Ming Wang Page 1 of 1

It is certified that error appears in the above-identified patent and that said Letters Patent is hereby corrected as shown below:

On the Title Page

Item (56) References Cited, OTHER PUBLICATIONS, Report on Patentability cite:
Please correct "PCT/US2016/022800" to read -- PCT/US2016/022600 --

Item (56) References Cited, OTHER PUBLICATIONS, Supplemental European Search Report cite:
Please correct "15746888:9" to read -- 15746888.9 --

Signed and Sealed this
Thirtieth Day of April, 2019

Andrei Iancu
*Director of the United States Patent and Trademark Office*